United States Patent [19]

Grimes

[11] 3,796,453
[45] Mar. 12, 1974

[54] DOGGIE MAID

[76] Inventor: Lillian P. Grimes, 600 3rd St. S.W., Washington, D.C. 20024

[22] Filed: Sept. 26, 1972

[21] Appl. No.: 292,467

[52] U.S. Cl................ 294/1 R, 15/257.2, 294/52
[51] Int. Cl.............................................. A47l 13/52
[58] Field of Search.......... 294/1 R, 2, 10, 19 R, 24, 294/49, 50.6, 51, 52, 53.5; 15/104.8, 257.1, 257.2, 257.7; 56/400.04, 400.08, 400.11

[56] References Cited
UNITED STATES PATENTS

| 3,382,523 | 5/1968 | Parsisson | 15/257.2 |
| 1,748,835 | 2/1930 | Everitt | 294/52 |
| 2,691,284 | 10/1954 | Mearns | 15/257.2 |
| 1,466,454 | 8/1923 | Mock | 15/257.2 |
| 3,170,183 | 2/1965 | Leatherman | 15/257.1 |
| 1,175,552 | 3/1916 | Neal et al. | 306/14 |
| 2,553,727 | 5/1951 | Schlutz | 15/257.2 |
| 3,018,502 | 1/1962 | Lossius | 15/257.2 |

FOREIGN PATENTS OR APPLICATIONS

| 365,188 | 12/1962 | Switzerland | 15/257.2 |

Primary Examiner—Evon C. Blunk
Assistant Examiner—Johnny D. Cherry
Attorney, Agent, or Firm—Browne, Beveridge, De-Grand & Kline

[57] ABSTRACT

An apparatus which enables pet owners to remove pet excrement from unwanted areas and to deposit it in more acceptable locations, for instance at the gutter side of the curb. The apparatus comprises a shovel having a handle member and a collection member capable of being locked in one of two positions, a rake having a handle member and curved prongs at one end thereof, and a pail comprised of a container and a top having an opening therein. The excrement may be moved with the use of the rake onto the collection member of the shovel and then deposited at a more acceptable location. The rake is stored in the concave handle member of the shovel and the shovel is inserted through the opening in the container top for storage.

1 Claim, 4 Drawing Figures

PATENTED MAR 12 1974   3,796,453
FIG.1
FIG.2    FIG.4
FIG.3
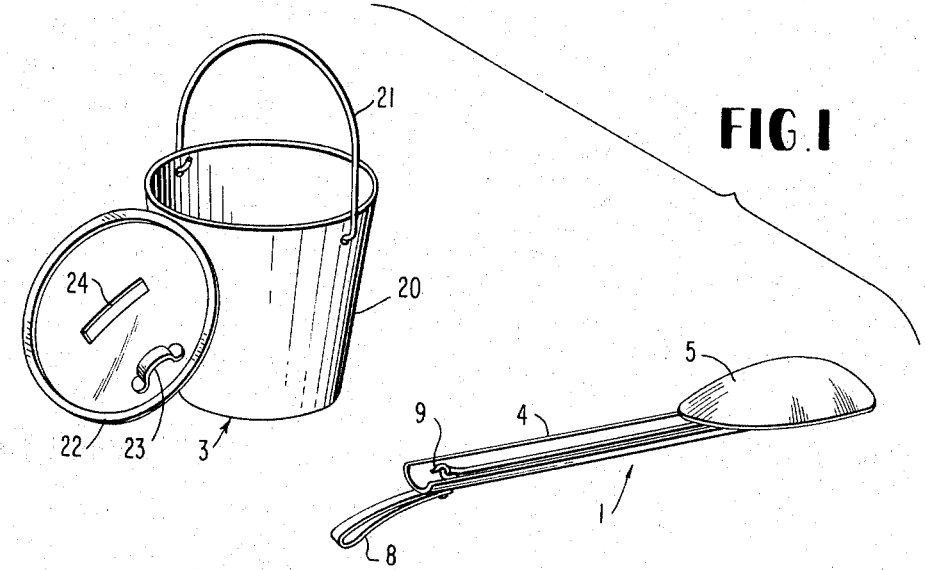
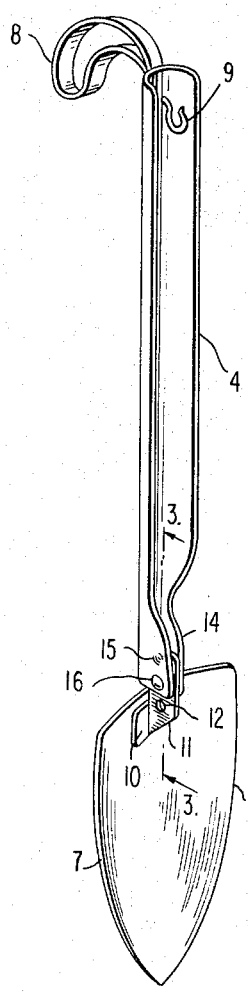
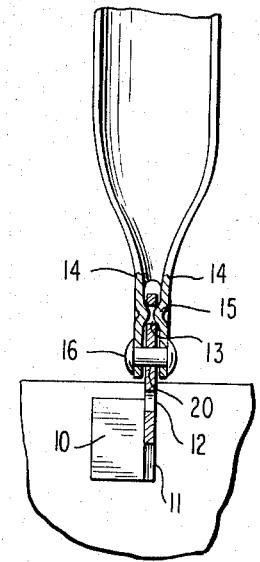
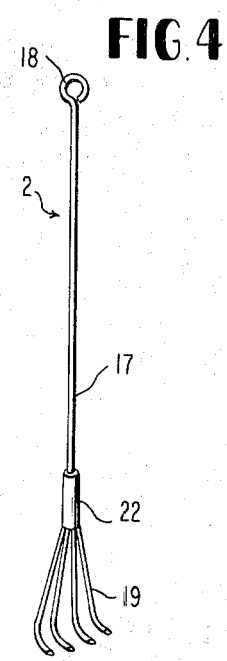

DOGGIE MAID

This invention relates to an apparatus which enables pet owners to remove pet excrement from unwanted areas and to deposit it in more acceptable locations, for instance at the gutter side of the curb.

It is not always possible to train pets to attend to their needs at locations which society has deemed acceptable. Even pets which may be considered to be "trained" will sometimes vary from their normal routine and provide the owner and pedestrianspasserbys with unpleasant surprises at undesirable locations. The present invention provides a solution to this problem which is to provide a means for allowing the person attending the pet to remove the excrement which is deposited where it does not belong and to re-deposit it at a more acceptable location. Because according to the means of the invention a human being is ultimately responsible for the location at which the excrement is deposited perfect "curbing" results are always attained.

It is therefore an object of the invention to provide an apparatus for enabling a pet owner to effectively curb his pet.

It is a further object of the invention to provide an apparatus for collecting and disposing of animal fecal matter which can be easily stored.

The invention will be more fully understood by referring to the following detailed description in conjunction with the drawings in which:

FIG. 1 is a pictorial illustration of all of the components of the apparatus of the invention.

FIG. 2 is an illustration of the shovel shown at 1, in FIG. 1.

FIG. 3, is a detailed drawing of the detent mechanism of the shovel.

FIG. 4, is an illustration of the rake which is shown inserted in the shovel handle in FIG. 1.

Basically, the apparatus of the invention is comprised of shovel 1, rake 2, and pail 3. Excrement which has been deposited by a pet such as a dog being walked by his owner, in an unwanted place may be manipulated by the owner with the rake onto the shovel and may then be carried to a more desirable location such as the gutter side of a curb where the shovel is emptied.

Shovel 1, shown in FIGS. 1 and 2 is comprised of handle member 4 and collection member 5. Both the handle member and the collection member may be made of any suitable metal such as aluminum, or of a plastic material. Handle member 4 is a member of concave cross-section having inner and outer concentric concave surfaces. Member 4 is somewhat tapered near the bottom end thereof at portions 14 and has a hook means 9 disposed near the top end at the inner concave surface as shown in FIG. 1. Carrying loop 8 is attached to the top of the outside of handle member 4 for easy carrying of the shovel and may be made of plastic or leather material.

Collection member 5 is slightly concave in shape so as to suitably accommodate the excrement. Thus, as shown in FIG. 2, sides 6 and 7 project forward slightly further than does the middle of the member. Collection member 5 is arranged so that it may be locked in one of two positions, the operating position as shown in FIG. 2 and the storage position as shown in FIG. 1. In the opening operating position the concave collection surface is directed downwardly for collecting the fecal matter and in the closed storage position the surface is directed upwardly and covers part of the shovel handle member as shown in FIG. 1. Handle member 4 as shown in FIGS. 2 and 3 is tapered at neck portions 14, located on either side of member 11. The concave collection surface has support piece 10 attached thereto, for instance by welding if the collection member is metal. Secured to piece 10, for instance, again by welding, is longitudinally extending member 11, having three holes 12, 13 and 20 therein. Seal member 16, secures portions 14 of the handle member to member 11 of the collection member by being inserted through hole 20 of member 11 and therefor collection member 5, may therefor pivot about seal member 16.

Neck portions 14 have projections 15, molded therein. Projections 15 in combination with holes 12 and 13, form a detent mechanism which allows the collection member to be locked either in the operating or storage position.

In the operating position shown in FIGS. 2 and 3, projections 15 are locked into hole 13. To move the collection member to the storage position shown in FIG. 1, it is necessary to move the collection member in a counter-clockwise direction in FIG. 2, so that hole 13, becomes displaced from projections 15. The Collection member may then be rotated in the counter-clockwise direction about seal member 16, until hole 12 encounters projections 15. The Collection member may then be rotated in the counterclockwise direction about seal member 16, until hole 12 encounters projections 15, whereupon the collection member is pushed toward projections 15 until they lock into hole 12 and the collection member is locked in the storage position shown in FIG. 1.

Rake 2, is shown in its entirety in FIG. 4. The rake is comprised of long, tubular handle member 17, which terminates at the top end thereof in loop 18 and at the bottom end thereof in prongs 19. The rake may be comprised of any suitable metal such as for instance, aluminum. As can be seen in FIG. 4, prongs 19 are curved and may be secured to the handle portion 17 by bonding, twisting, or cementing as known to those skilled in the art.

Pail 3, shown in FIG. 1 is comprised of container 20 and top 22. Container 20, has a carrying handle 21 attached thereto and top 22 has a handle 23 attached thereto. Top 22, additionally has an opening 24 therein so that the shovel may be inserted in the pail when not in use.

In use, if a pet owner, for instance when walking his pet, discovers that the pet has relieved himself in an undesirable location, he would then use prongs 19 of the rake 2, to move the excrement along the ground onto the collection surface of member 5 of shovel 1 with the collection member being in the operating position. The shovel would be held at handle member 4 so that the lower edge of collection member 5 abuts the ground and the rake is held at handle member 17 and used to move the excrement onto collection member 5 in dust-pan fashion. The excrement is then carried on the shovel to an acceptable place such as the gutter side of the curb where the shovel is emptied. For storage purposes rake 2 which is shorter than handle member 4 is hung on hook 9 at loop 18 so that the rake rests along the inner concave surface of member 4 as shown in FIG. 1. The collection member 5 of the shovel is moved to the storage position shown in FIG. 1 by engaging projections 15 with hole 12 of member 11 and the entire shovel can be placed in opening 24 of container top 22, with the top in place on the container for storage. The container 20 may be filled with a disinfectant cleaning fluid while the apparatus is stored.

In an exemplary embodiment of the invention for medium sized dogs a shovel handle of approximately 24 inches may be used having a circumference of ¾ inches and a collection member which is 3 inches wide. The rake handle may be 22 inches long and the width across the prongs should be less than the internal diameter of the shovel handle member 4. The container of the pail may be about 8 inches tall and 6 inches wide. It is to be understood that the above dimensions are exemplary only and that changes to dimensions will be apparent to those skilled in the art and which come within the spirit and scope of my invention.

I claim:

1. Apparatus for collecting and disposing of animal fecal matter, comprising in combination a shovel and a rake having a plurality of substantially rigid prongs, the shovel being comprised of a handle member and a collection member which is located at one end of said handle member, said collection member including a concave collection surface which comes to a point at the forwardmost end thereof, and said rake including a rake handle member and a plurality of curved prongs attached at one end thereto which converge at said one end of said rake handle member and diverge in a direction away from said rake handle member, said rake handle member having a loop at the top end thereof, said handle member of said shovel comprising an elongated concave member having outside and inside concave surfaces, said inside surface defining an elongated round concave cavity for accomodating said rake, a hook means for engaging said loop and hanging said rake being disposed on said inside concave surface near the top thereof, said concave member being at least as long as said rake, said shovel including means for rendering said collection member movable between an open position in which said collection surface is directed downwardly for collecting said fecal matter and a closed storage position in which said collection surface is directed upwardly in a position approximately 180° removed from said open position and covers part of said inside concave surface and said rake when said rake is in said concave cavity, a pail in which said shovel and rake may be stored, said pail having a removable top which has an opening therein for allowing the handle member of said shovel to pass therethrough when said shovel is in said pail.

* * * * *